US006581467B1

(12) United States Patent
Martinez et al.

(10) Patent No.: US 6,581,467 B1
(45) Date of Patent: Jun. 24, 2003

(54) PORTABLE GAS PURGE AND FILL SYSTEM FOR NIGHT VISION EQUIPMENT

(75) Inventors: Erasmo Martinez, Torrance, CA (US); Earl Winter, Los Angeles, CA (US)

(73) Assignee: Raytheon Company, Lexington, MA (US)

(*) Notice: Subject to any disclaimer, the term of this patent is extended or adjusted under 35 U.S.C. 154(b) by 0 days.

(21) Appl. No.: 08/576,862

(22) Filed: Dec. 21, 1995

Related U.S. Application Data

(63) Continuation-in-part of application No. 08/392,283, filed on Feb. 22, 1995, now Pat. No. 5,551,302, which is a continuation of application No. 08/007,942, filed on Jan. 25, 1993, now abandoned.

(51) Int. Cl.$^7$ .............................................. G01L 27/00
(52) U.S. Cl. ......................................... 73/714; 73/1.57
(58) Field of Search ................................ 73/1.57, 1.71, 73/1.72, 714; 141/1, 4, 94, 98, 311, 319, 382

(56) References Cited

U.S. PATENT DOCUMENTS 3,870,072 A * 3/1975 Lindemann .................. 137/557
4,370,997 A * 2/1983 Braithwaite et al. ..... 137/116.3
5,069,072 A * 12/1991 Taylor et al. ................ 439/628

* cited by examiner

*Primary Examiner*—Robert Raevis
(74) *Attorney, Agent, or Firm*—Colin M. Raufer; Leonard A. Alkov; Glenn H. Lenzen, Jr.

(57) ABSTRACT

A portable gas purge and fill system. The inventive system (10) includes a portable housing having gas inlet and outlet couplings. An electronic pressure gauge (30) is disposed within the housing (11) for measuring the pressure of the fluid at the outlet (24) thereof. A self-check mechanism (32) is disposed within the housing (11) for verifying calibration and operation of the electronic pressure gauge (30). A pressure regulator (20) is disposed within the housing and connected between the inlet (12) and outlets (24) thereof. A second gauge (14) is included for measuring the pressure of the fluid contained in the source. First, second and third two-way valves (18, 22, and 28) are included. The first two-way valve (18) is mounted between the second gauge (14) and the pressure regulator (20). The second two-way valve (22) is located between the pressure regulator (20) and the outlet (24). The third two-way valve (28) is located between the pressure regulator (20) and the self-check mechanism (32). A conventional safety valve (26) is connected to the line between the pressure regulator (20) and the electronic pressure gauge (30). The safety valve (26) maintains the pressure in the regulator 20 below a predetermined safe threshold.

8 Claims, 2 Drawing Sheets

PORTABLE GAS PURGE AND FILL SYSTEM FOR NIGHT VISION EQUIPMENT

REFERENCE TO RELATED APPLICATION

This is a continuation-in-part of U.S. patent application entitled PORTABLE GAS PURGE AND FILL SYSTEM FOR NIGHT VISION EQUIPMENT, filed Feb. 22, 1995 by E. Martinez et al., Ser. No. 08/392,283, which issued as U.S. Pat. No. 5,551,302 on Sep. 3, 1996, which is a continuation of 08/007/942 filed Jan. 25, 1993, now abandoned.

BACKGROUND OF THE INVENTION

1. Field of the Invention

The present invention relates to right vision equipment. More specifically, the present invention relates to systems for maintaining cooling systems for night vision equipment.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

The utility of night vision systems for military and commercial applications is currently well recognized. Many night vision systems use detectors which must be cooled to cryogenic temperatures for optimum performance. The cooling systems generally employ a working gas such as helium to achieve the desired low temperatures. However, helium has a tendency to leak because of the molecular, structure thereof. For optimum compression a purge of the chamber is required to assure that there is no moisture in the chamber which may solidify as ice during cooling and clog the minute passages of the device. After purging the chamber, the chamber is refilled with the working gas.

Conventional systems for purging and filling the cooling systems of night vision equipment are embodied in large, heavy, bulky, non-movable consoles. The consoles provide a workbench and gauges and other instruments for regulating the purge and fill operation.

Unfortunately, the size of the console is typically such that field maintenance of the night vision system is impractical. Thus, each system to be serviced must be removed from service and brought to a location having a purge and fill console.

Thus, there was a need in the art for a portable system for purging and filling the night vision cooling systems. This need has been substantially addressed by the invention of the above-referenced parent application entitled PORTABLE GAS PURGE AND FILL SYSTEM FOR NIGHT VISION EQUIPMENT of which the present application is a continuation-in-part. However, for safety reasons, a need remains in the art for a method for checking the pressure in the regulator of the subject unit before opening the outlet valve.

SUMMARY OF THE INVENTION

The need in the art is addressed by the present invention which provides a portable gas purge and fill system. The inventive system is disposed in a portable housing with gas inlet and outlet couplings. A safety valve is connected to the outlet of a pressure regulator. The safety valve maintains the pressure in the regulator below a predetermined safe threshold. In a specific implementation, the invention further includes a self-venting pressure regulator connected between the inlet and outlets thereof. A second gauge is included for measuring the pressure of the fluid contained in the source. First, second and third two-way valves are included. The first two-way valve is mounted between the second gauge and the pressure regulator. The second two-way valve is located between the pressure regulator and the outlet. The third two-way valve is located between the outlet and the self-check mechanism. A conventional check valve is included for safety concerns.

As all of the components are disposed within a single housing, a safe, lightweight, portable purge/fill system is provided.

DESCRIPTION OF THE INVENTION

Illustrative embodiments and exemplary applications will now be described with reference to the accompanying drawings to disclose the advantageous teachings of the present invention.

Figure 1:
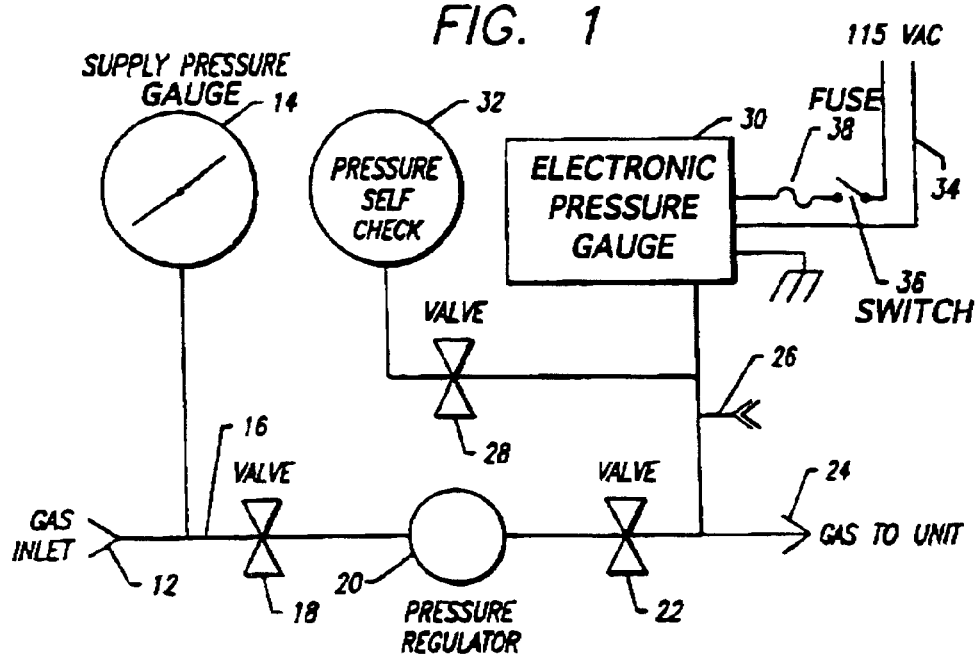
FIG. 1 is a pneumatic schematic of an illustrative implementation of the portable gas purge and fill system of the present invention.

FIG. 1 is a pneumatic schematic of an illustrative implementation of the portable gas purge and fill system of the present invention. The system 10 includes a conventional ¼ inch gas inlet fitting 12 suitable for connection to a gas bottle. The inlet 12 is connected to a supply pressure gauge 14 via a ¼ inch stainless steel line 16. In the illustrative embodiment, the pressure gauge 14 is a conventional 2 inch diameter gauge accurate within the desired range (e.g., 5000 psi). The pressure gauge 14 may be purchased from U.S. Gauge and other such companies. A first two-way valve 18 is connected between the inlet 12 and a pressure regulator 20. The first valve 18 is a conventional ¼ inch in-line on-off valve of the needle, gate or ball valve variety by way of example.

A pressure regulator 20 is connected to the outlet of the first valve 18. The pressure regulator 20 should be a self-venting regulator. In the illustrative embodiment, the pressure regulator 20 is a conventional 14 inch pressure regulator having an inlet/outlet pressure rating of 5000/500 for example. The pressure regulator may be purchased from Fairchild and other similar manufacturers.

A second two-way valve 22 connects the pressure regulator 20 to a flair-type fitting 24 from Parker or other manufacturer. The fitting 24 provides a gas outlet suitable for connection to a cooling system such as that used in connection with night vision equipment.

For safety, a novel aspect of the present invention is the provision of a conventional check valve 26 connected to the line 17 between the pressure regulator 20 and the second two-way valve 22. The other side of the check valve 26 is connected to an electronic regulated pressure gauge 30. The check valve 26 is designed to open at a selected pressure. By connecting the check valve 26 at the outlet of the pressure regulator 20, the pressure in the regulator 20 is maintained below a predetermined safe level.

The electronic pressure gauge may be purchased from Pennwalt Corporation for example. The electronic pressure gauge 30 is equipped with a power cord 34, a power switch 36 and a fuse 38.

A third-two-way valve 28, constructed in the illustrative embodiment in the same manner as the, first and second valves, 18 and 22, is connected between the electronic regulated pressure gauge 30 and a pressure self-check unit 32. The pressure self-check unit 32 is a dead weight float designed to check the calibration and operation of the electronic pressure gauge 30 at a selected pressure.

In operation, the first, second and third valves 18, 22, and 28 are closed. Pressure regulator 20 is closed. The switch for the electronic pressure gauge 30 is turned on. A supply of gas (not shown) is connected to the gas inlet fitting 12 by means of a pressure bottle adapter 44. The supply pressure is read from the supply pressure gauge 14. The first and third valves 18 and 28 are opened and pressure regulator 20 is adjusted to a pressure sufficient to cause the weight on the pressure self-check tester 32 to float.

The pressure value read on the electronic pressure gauge 30 is compared to the pressure value read on the pressure self-check unit. If the electronic pressure gauge 30 and the pressure self-check unit 32 are within predetermined accuracy ranges, the purge and fill operation continues. If not within predetermined values, the operation stops and the unit is sent to a depot for maintenance and recalibration. It should be noted that the present invention allows for a check of calibration and operation in the field. No return to a central depot or the manufacturer is necessary for this check. If the operation continues, the pressure regulator 20 is closed which allows downstream pressures to vent the atmosphere. The third valve 28 is closed and fitting 24 is connected to the cooling unit (not shown) via unit test port adapter 48. The knob 47 on the unit test port adapter 48 is turned counter clockwise (ccw) one complete turn to open the fill valve on the cooling unit. The second valve 22 is opened. The pressure regulator 20 is then opened and adjusted to the required purge pressure, as indicated on the electronic pressure gauge 30.

The purge process consists of pressurizing the unit, then depressurlzing by closing the pressure regulator 20, waiting until the pressure returns to atmospheric, and then repeating the operation a specified number of times.

After a cooling unit is purged, it may be filled by the present system by adjusting the pressure regulator 20 to the required fill pressure and then turning the knob 47 on unit test port adapter 48 clockwise (cw) until it stops. The unit is then disconnected from the test port adapter 48.

Figure 3:
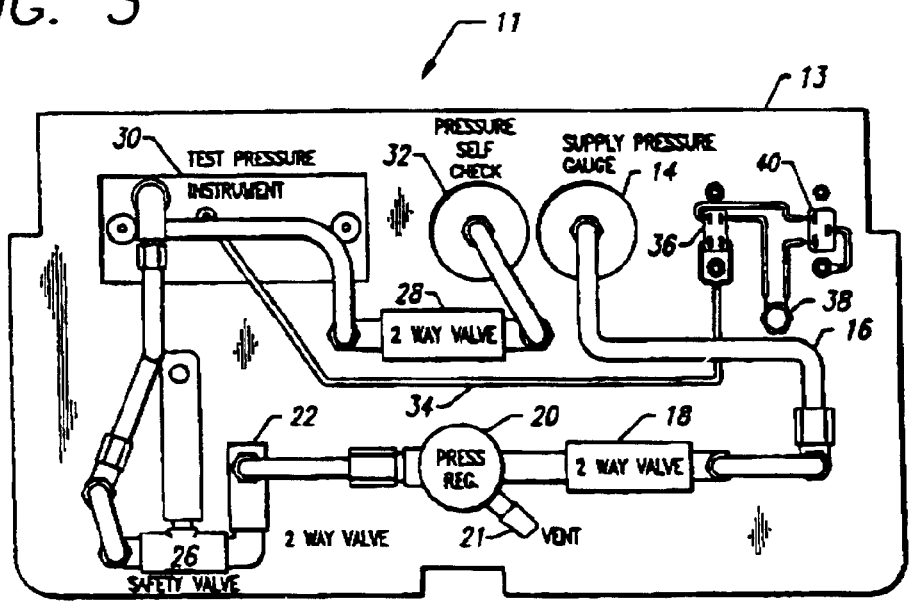
FIG. 3 is a rear view of the instrument panel of the illustrative implementation of the portable gas purge and fill system of the present invention.
Figure 2:
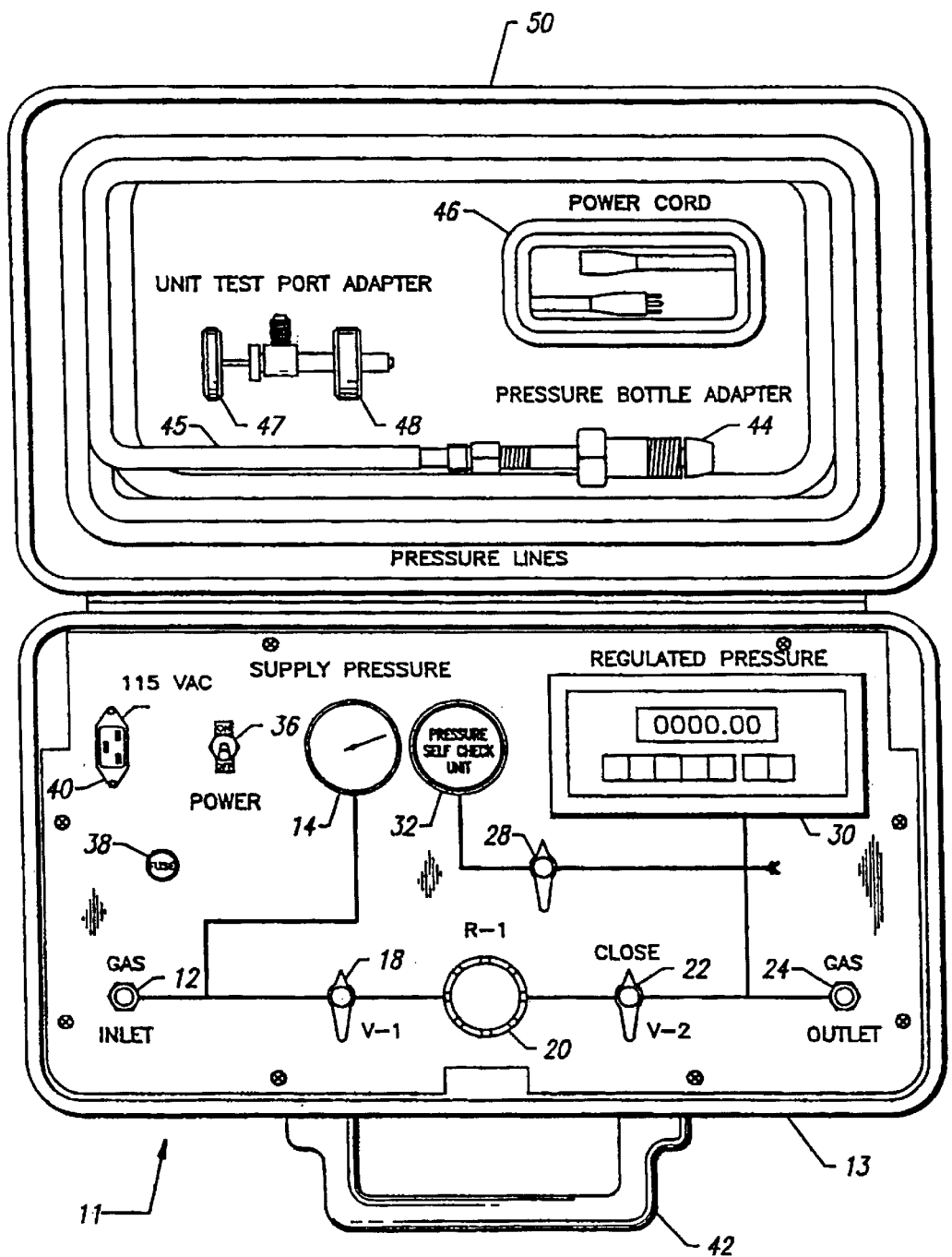
FIG. 2 is a top view of the illustrative implementation of the portable gas purge and fill system of the present invention in an open position.

FIG. 2 is a top view of the illustrative implementation of the portable gas purge and fill system of the present invention in an open position. FIG. 3 is a rear view of the instrument panel of the illustrative implementation of the portable gas purge and fill system of the present invention. The invention is disposed within a housing 11 in a bottom portion 13 thereof In the best mode, the housing 11 is constructed of aluminum.

In accordance with the present teachings, a portable (e.g., 15 pound) unit may be provided having dimensions of 9.5 by 16.5 by 7 inches. A handle 42 may be provided. A pressure bottle adapter 44 with associated hose 45, power cord 46 and unit test port adapter 48 may be disposed in a cover 50 for the unit.

Thus, the present invention has been described herein with reference to a particular embodiment for a particular application. Those having ordinary skill in the an and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A portable gas purge and fill system comprising:

a portable housing;

inlet means disposed within the housing for receiving fluid from a source;

outlet means disposed within the housing for communicating the fluid supplied via the inlet means to an external unit;

a pressure regulator connected between the inlet means and the outlet means; and a safety valve connected to an outlet from the pressure regulator.

2. The invention of claim 1 further including an electronic pressure gauge disposed within the housing and connected to the pressure regulator.

3. The invention of claim 2 further including means disposed within the housing for verifying calibration and operation of the electronic pressure gauge.

4. The invention of claim 3 further including a second gauge for measuring the pressure of the fluid contained in the source.

5. The invention of claim 4 further including a first two-way valve disposed within the housing between the second gauge and the pressure regulator.

6. The invention of claim 5 further including a second two-way valve disposed within the housing between the pressure regulator and the outlet means.

7. The invention of claim 6 further including a third two-way valve disposed within the housing between the pressure regulator and the means for verifying calibration and operation of the electronic pressure gauge.

8. A method for providing for safe handling of a portable gas purge and fill system comprising: a portable housing; an inlet disposed within the housing for receiving fluid from a source; an outlet disposed within the housing for communicating the fluid supplied via the inlet to an external unit, and a pressure regulator connected between the inlet and the outlet, said method including the step of connecting a safety valve to an outlet from the pressure regulator.

* * * * *